Feb. 21, 1933.  W. E. McCULLOCH ET AL  1,898,376
BRAKE PEDAL DEPRESSOR MECHANISM
Filed April 8, 1929
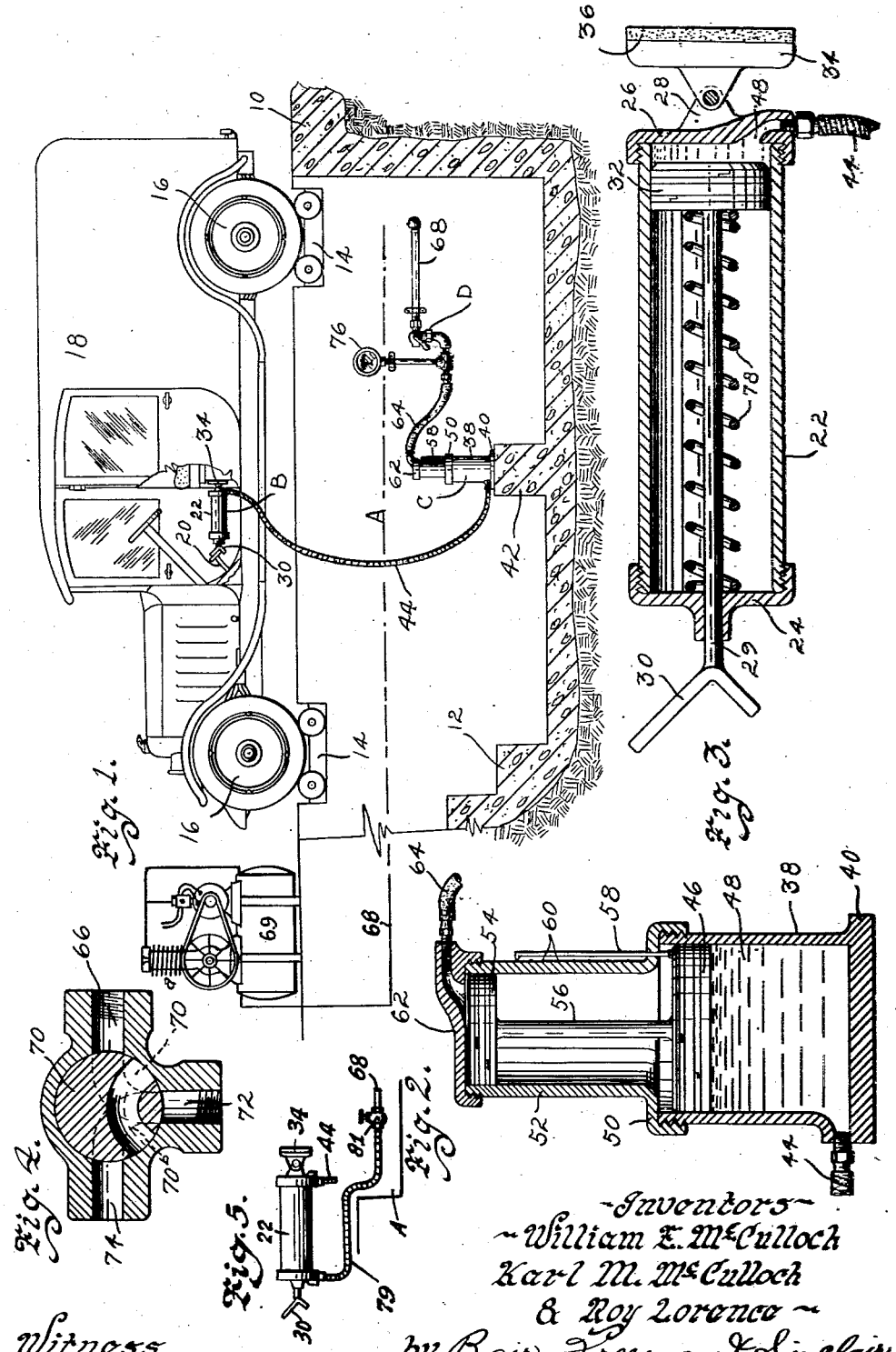
Inventors
William E. McCulloch
Karl M. McCulloch
& Roy Lorenco
by Bair, Freeman & Sinclair
Attorneys
Witness
Orval Floden Patented Feb. 21, 1933

1,898,376

UNITED STATES PATENT OFFICE

WILLIAM E. McCULLOCH, KARL M. McCULLOCH, AND ROY LORENCE, OF DES MOINES, IOWA; SAID LORENCE ASSIGNOR TO JAMES ASHLEY, OF DES MOINES, IOWA

BRAKE PEDAL DEPRESSOR MECHANISM

Application filed April 8, 1929. Serial No. 353,493.

The object of this invention is to provide a brake pedal depressor mechanism of simple, durable, and comparatively inexpensive construction.

A further object of our invention is to provide a brake pedal depressor mechanism so made and arranged as to be easily manipulated by an operator.

More particularly, it is our object to provide such a depressor mechanism in combination with a testing apparatus and pit of the type now in general use for testing the brakes of automobiles. It may here be mentioned that these brake testing apparatuses consist of a pit having four resistance measuring devices, two on each side of the pit, on which the wheels of the automobile rest. An operator remains within the pit for checking up on the brakes by observing the indicators attached to the resistance measuring devices and this operator adjusts the brakes until they are all equalized, as specified by the manufacturer of the car.

In this type of apparatus it has heretofore been the practice for a second operator to be positioned within the automobile for the purpose of pressing the brake pedal downwardly so as to set the brakes. The operator in the pit must give orders to the one in the car as to when to apply the brakes and in what degree to apply them. This is often unsatisfactory, because of other noises in the garage where the test is being made. It is therefore our specific purpose to provide a brake pedal depressor which may be manipulated by the operator in the pit, thus eliminating the second operator and the uncertainty, due to vocal communication between the two.

More specifically, it is our object to provide a pressure actuated depressor for the brake pedal, which may be supplied from a source of pressure controllable by a valve located within the pit.

Still a further object is to provide indicating means within the pit so that the operator therein may determine just how much pressure is being applied to the brake pedal or what the position of the brake pedal is relative to its normal non-depressed position.

With these and other objects in view, our invention consists in the construction, arrangement and combination of the various parts of our device, whereby the objects contemplated are attained, as hereinafter more fully set forth, pointed out in our claims, and illustrated in the accompanying drawing, in which:

Figure 1 is a cross sectional view through a brake testing pit, illustrating the resistance measuring devices with an automobile supported thereon, our improved brake pedal depressing mechanism operatively connected therewith and diagrammatically showing a source of air supply.

Figure 2 is an enlarged vertical sectional view through a portion of the brake pedal depressing mechanism shown in Figure 1.

Figure 3 is a similar view of another portion thereof;

Figure 4 is an enlarged detail sectional view through a valve used in connection with our device for controlling the supply of pressure to the pressure actuated means; and Figure 5 is a side elevation of a modified form of device.

On the accompanying drawing, we have used the reference character A to indicate generally, a pit. This pit is usually formed in a concrete floor 10 and may be provided with steps 12, whereby entrance to the pit by an operator is facilitated. On top of each side wall of the pit A, a pair of resistance measuring devices 14 is mounted. The resistance measuring devices usually include rollers for supporting the wheels 16 of an automobile 18, the brakes of which are to be tested. The brake pedal of the automobile 18 is indicated at 20.

The foregoing description is of the ordinary type of brake testing apparatus and automobile and forms no part of our present invention, but is illustrated merely for the purpose of showing the relation of our device with the brake testing apparatus and automobile.

Our invention consists of a brake pedal depressing means B, a hydraulic transmission means C and control mechanism D. The pressure actuated means B consists of a cylinder 22 having heads 24 and 26. The head 24 is provided with a hub through which a piston rod 27 is slidably mounted. A brake pedal engaging member 30 is secured to one end of the piston rod 27. Secured to the other end thereof and located within the cylinder 22 is a piston 32. The head 26 is provided with ears 28 to which is pivotally connected a foot member 34. The foot member 34 may be provided with a pad 36 of rubber or the like to prevent slippage.

The hydraulic transmission device C consists of a cylinder 38 having a flange 40 secured to the floor of the pit or to a raised portion 42 thereof. The cylinder 38 is connected by a flexible hose 44 with the head 26 of the cylinder 22. Within the cylinder 38, an oil piston 46 is slidably mounted. A liquid 48 fills the cylinder 38 below the piston 46, the tube 44 and the cylinder 22 between the piston 32 therein and the head 26 thereof.

The cylinder 38 is provided with a head 50 terminating in an air cylinder 52 in which is slidably mounted an air piston 54. The pistons 54 and 46 are operatively connected together by a piston rod 56. In connection with the piston 46 an indicator rod 58 extends through the head 50 for indicating the position of the piston 46. Graduation marks 60 are formed on the cylinder 52, whereby the rod 58 operates in conjunction with the marks to indicate the position of the piston 46. Since the transmission of motion from the piston 46 to the piston 32 is by movement of a fluid which is incompressible, these two pistons will travel a proportional distance relative to each other and the operator of the device soon learns to accurately judge the positions of the brake pedals on the various cars by the position of the rod 58 relative to the indicating marks 60.

The air piston 52 is provided with a head 62, which is pneumatically connected with the controlling device D by means of a tube or the like 64. The controlling device D is merely a valve of the three-way type, as clearly shown in Figure 4 of the drawing. A source of air supply such as the compressed air storage tank 69 shown diagrammatically in Figure 1 is piped to the passageway 66 of the valve D by means of a pipe or the like 68. When in one of its positions the rotor 70 of the valve D connects the passageway 66 with a passageway 72 thereof. The passageway 72 is connected with the tube 64 and the valve is provided with another passageway 74 for discharging air to atmosphere. An air pressure gauge 76 may be used in connection with our device for indicating pressure exerted on the air piston 54 the pressure gauge 76 can be watched by the operator and when the needle suddenly turns to indicate a higher pressure he knows that the pedal depressing operation has started after which the travel of the rod 29 is shown by the rod 58. The graduations 60 may be arranged to indicate actual inches of travel of the rod 29.

*Practical operation*

In the operation of our device the automobile 18 is driven onto the brake testing apparatus to be tested in the ordinary way. The door of the automobile is opened and the brake pedal depressor means B is interposed between the seat of the automobile and the brake pedal 20 thereof.

The valve D is now turned from the full line position shown in Figure 4 to the dotted line position indicated at 70a. Air will now enter from the pipe 68 and force the pistons 54 and 46 downwardly, whereupon the liquid 48 will be driven through the tube 44 for forcing the piston 32 outwardly and thereby depressing the brake pedal 20. When the brake pedal has been depressed to a predetermined position as indicated by the rod 58, or when a predetermined pressure has been applied thereon as indicated by the gauge 76, the valve D may be turned to the off position shown in full lines in Figure 4. The brakes of the automobile may now be tested and adjusted as desired.

If less pressure is desired on the brake pedal, a portion of the air in the cylinder 52 may be discharged to the atmosphere by moving the valve D to the dotted line position 70b, and then again moving it to off position. After the testing job is finished, the valve is moved to the position 70b for allowing the brake pedal to again assume normal position, as caused by the return spring in the brake pedal. The return spring of the brake pedal, if not sufficient to return the piston 32 toward the end 26 of the cylinder 22 may be supplemented by a spring 78 contained within the cylinder. In lieu of the spring 78, air may be introduced into the forward end of the cylinder 22 as through an air pipe 79 (see Figure 5) and controlled by a suitable valve arranged in the pit A.

It will be readily obvious that we have provided a brake pedal depressor mechanism conveniently operated by one operator located within the pit A, who may also test the brakes and adjust them during testing operations. The services of a second operator are entirely dispensed with, thereby substantially reducing the brake testing cost.

Our device being provided with indicating means is adapted to control the brake as desired, with an accurate way for the operator to know how far the brake pedal is depressed or how much pressure is to be applied thereto. The air gauge 76 may be graduated to indicate the actual pounds being applied to the brake pedal 20 rather than pressure per square inch, if so desired.

Some changes may be made in the construction and arrangement of the parts of our device without departing from the real spirit and purpose of our invention, and it is our intention to cover by our claims, any modified forms of structure or use of mechanical equivalents, which may be reasonably included within their scope.

We claim as our invention:

1. For use with a brake testing apparatus, a brake pedal depressor mechanism comprising a pressure actuated device for engaging and depressing the brake pedal of an automobile being tested on said apparatus, a movable member located below an automobile when said automobile is on said apparatus, means for moving said movable member, indicating means associated with said movable member for indicating the extent of travel thereof and means for transmitting the movement of the movable member to the pressure actuated device in exact proportion to the movement of the movable member for moving said pressure actuated device upon movement of the movable member.

2. For use with a brake testing apparatus, a brake pedal depressor comprising a pressure actuated means for engaging and depressing the brake pedal of an automobile being tested on said apparatus, an oil transmission means having an oil connection with the pressure actuated means and having a movable element, a conduit for supplying air under pressure to said oil transmission means for moving said movable element and thereby moving the oil in said oil transmission means and in said oil connection, indicating means associated with said movable element to indicate the travel of the oil in said oil connection and a valve in said conduit controllable by an operator located remote from the brake pedal depressor for regulating the supply of air to the oil transmission means.

WILLIAM E. McCULLOCH.
KARL M. McCULLOCH.
ROY LORENCE.